Nov. 11, 1969   B. I. WADSÖ   3,477,820
MINIATURIZED REACTION VESSEL FOR MIXING SMALL QUANTITIES
OF LIQUIDS WITH A MINIMUM AMOUNT OF THERMAL DISTURBANCE
Filed June 13, 1966   2 Sheets-Sheet 1

Bertil Ingemar Wadsö,
Inventor

By Wenderoth, Lind and Ponack
Attorneys

United States Patent Office  3,477,820
Patented Nov. 11, 1969

3,477,820
MINIATURIZED REACTION VESSEL FOR MIXING SMALL QUANTITIES OF LIQUIDS WITH A MINIMUM AMOUNT OF THERMAL DISTURBANCE
Bertil Ingemar Wadsö, Lund, Sweden, assignor to LKB-Produkter AB, Fredforsstigen, Mariehall, Sweden, a corporation of Sweden
Filed June 13, 1966, Ser. No. 557,091
Int. Cl. B01f 9/00; G01k 17/00
U.S. Cl. 23—253                                    7 Claims

ABSTRACT OF THE DISCLOSURE

An apparatus for mixing a first fluid and a second fluid with a minimum amount of thermal disturbance has a vessel defined by two substantially flat side walls and a circumferential wall spacing and joining the side walls. The vessel is mounted for turning about a substantially horizontal axis perpendicular to the side walls. A partition is provided in the vessel for dividing the space within the vessel into a relatively large compartment initially containing the first fluid and a relatively small compartment initially containing the second fluid and acting as a bucket during the turning of the vessel in one direction for first pouring the second fluid into the first fluid, then dipping into the combined fluids to entrap air, and then permitting the air entrapped therein to escape therefrom by bubbling up through the combined fluids to mix them.

---

Figure 1:
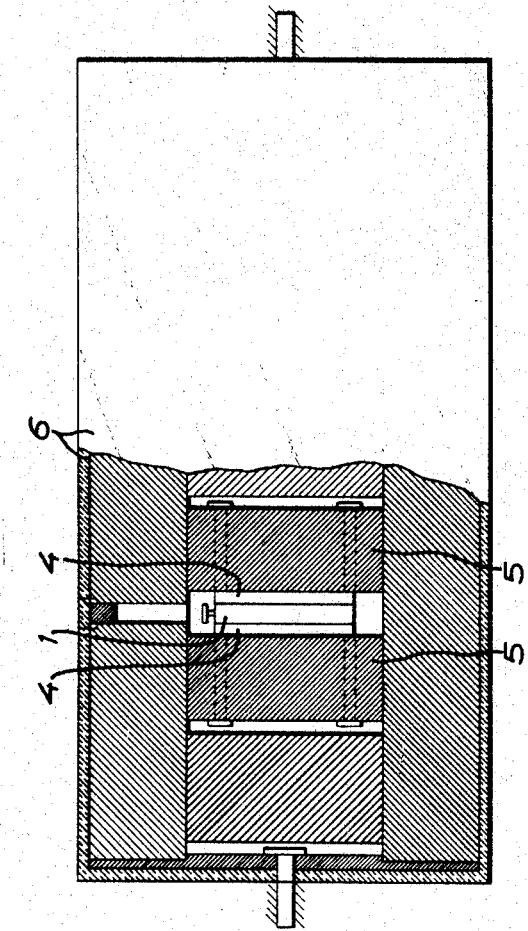

The present invention relates generally to apparatus for use in microcalorimetry in which the heat producing or consuming characteristics of chemical and biochemical reactions in small quantities or liquids are investigated and analyzed by mixing the liquids in a reaction vessel encompassed by a thermopile encompassed by a heat sink and measuring the electrical signal caused by flow of heat through the thermopile between the reaction vessel and the heat sink. In a so called heat leakage microcalorimeter for applying the above principle for microcalorimeter the reaction vessel must permit keeping the reactants separated and mixing them only when thermal equilibrium has been established. One of the principles of known art to achieve this is to divide the space confined by the vessel walls into two compartments, to charge each of the two compartments with one of two different reactants and to carry out mixing of the two reactants by inversion or rotation of the vessel in the gravitational field, thus employing the difference in specific gravity between liquid and air to move and mix the reactants.

The present invention employs a modification of the last said principle for keeping the reactants separated in the reaction vessel and mixing them only after thermal equilibrium has been established and has for its object to provide for a very simple construction of the reaction vessel and an efficient arrangement of the thermopile and to make it possible to charge the reaction vessel with the two reactants and to carry out the mixing of them with a minimum amount of thermal disturbance in a very simple and efficient manner.

In accordance with the invention, the reaction vessel has the general shape of a flat, hollow body such as for instance a hollow, substantially circular disk with flat side walls and an annular wall spacing and joining said side walls and forming the circumference of the disk. This vessel in the shape of a flat, hollow body or disk is mounted for turning from a certain angular starting position about a substantially horizontal axis with the flat side walls of the vessel at substantially right angles to said axis, and the space confined by the said walls of the vessel is divided into a relatively large compartment and a relatively small compartment forming a bucket which in said angular starting position of the vessel is on one side of the vertical plane through the said substantially horizontal axis and during turning of the vessel about said axis in one direction from said angular starting position with said relatively large compartment partly filled with a first reactant and the relatively small compartment charged with a second reactant, pours the latter into the first reactant by tilting to the other side of said vertical plane and then entraps air by being immersed in the now collected reactants for then permitting the air entrapped therein to escape therefrom by bubbling up through the collected reactants to mix them.

Figure 2:
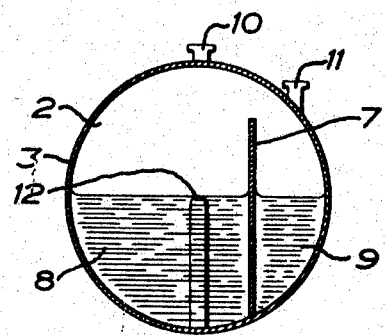
Figure 3:
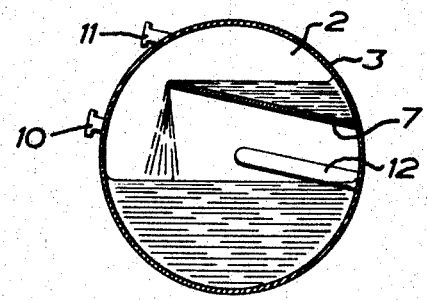
Figure 4:
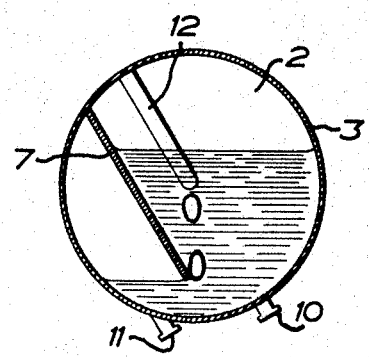

Further features of the invention and advantages gained thereby will become apparent to those skilled in the art from the following description of a preferred form of the invention which is more or less diagrammatically illustrated in the accompanying drawings in which:

FIG. 1 is a side view, partly in axial section, of an apparatus constructed in accordance with the invention and for applying the long-established principle of twin calorimetry;

FIG. 2 is a vertical section on a larger scale through the reaction vessel of one of the two equal units of the twin apparatus shown in FIG. 1, the section being taken in a plane perpendicular to the substantially horizontal longitudinal axis of the apparatus and with the reaction vessel in its predetermined angular starting position about said axis; and FIGS. 3 and 4 are sections similar to that of FIG. 2 but with the reaction vessel in different angular positions about the said axis of the apparatus during turning of the apparatus and thus the reaction vessel about said axis in one direction from the starting position for mixing the reactants.

The apparatus more or less diagrammatically shown in FIG. 1 comprises a reaction vessel 1 in the general shape of a flat, hollow body, preferably as shown in FIGS. 2 to 4 a hollow, circular disk with flat side walls 2 spaced and joined by an annular circumferential wall 3. A thermopile 4 is encompassed between the outsides of the flat side walls 2 and flat sides of blocks 5 forming parts of a heat sink enclosed in a preferably cylindrical casing 6 mounted for rotation about its longitudinal axis in substantially horizontal position thereof. The disk-shaped vessel 1 is placed with its side walls 2 at right angles to and with its center on the longitudinal axis of the apparatus and partakes in the turning or rotation of the apparatus about this axis. Also the heat sink and the thermopile partake in such rotation.

The space confined by the vessel walls 2, 3 is divided by means of a partition 7 into a relatively large compartment 8 to be partly filled with a first fluid and a relatively small compartment 9 to be charged with a second fluid when the vessel is in its predetermined angular starting position as shown in FIG. 2, the vessel being provided on its circumferential wall 3 with closable funnels 10 and 11 through which the fluids can be supplied to the said compartments 8 and 9 in measured quantities, say by means of a pipette or burette.

In the angular starting position of the vessel shown in FIG. 2, the partition 7 is at one side of and at a distance from the vertical plane through the axis of rotation of the apparatus and is preferably parallel to said plane. That end of the partition 7 which is the leading one during turning of the apparatus about its longitudinal and substantially horizontal axis in the intended direction leaves between itself and the circumferential wall 3 an opening, and the trailing end of the partition 7 joins the circumferential wall 3 so that portions of the latter and the side walls 2 together with the partition 7 give the relatively small compartment 8 the general shape of a bucket which during turning of the apparatus in the intended direction from the starting position with the relatively large compartment 8 partly filled with a first fluid and the relatively small compartment 9 charged with a second fluid tilts to the other side of the vertical plane through the axis of rotation for pouring said second fluid into said first fluid as illustrated by FIG. 3, then is immersed in the now collected fluids to entrap air and then permits the air entrapped therein to escape therefrom by bubbling up through the collected fluids to mix them as illustrated by FIG. 4.

Calibration of the calorimeter can be performed in the usual way by the aid of an electrical heating element 12 in the reaction vessel. This element 12 can be incorporated in the partition 7, if so desired.

As already mentioned, the apparatus is preferably built as a twin apparatus, implying that a second unit which is equal to that shown in the sectioned part of FIG. 1 and is intended for use as the blank in applying the long-established principle of twin microcalorimetry, is provided in the non-sectioned part of FIG. 1.

Obviously many modifications of the apparatus described with reference to the drawings are possible within the spirit and frame of the invention as defined in the appendant claims. Thus the shown circular form of the flat reaction vessel is suitable but not essential to the invention. Other configurations than circular, for instance square, can be used especially for adapting the configuration of the side walls of the vessel to the form or type of thermopile used.

What I claim and desire to secure by Letters Patent is:

1. Apparatus for mixing a first fluid with a second fluid with a minimum amount of thermal disturbance comprising two substantially flat side walls and a circumferential wall spacing and joining said side walls defining a vessel; means mounting said vessel for turning from a certain angular starting position about a substantially horizontal axis with said side walls at substantially right angles to said axis; an elongated partition joining said side walls and protruding from a portion of said circumferential wall and ending at a point inwards from said circumferential wall for dividing the space confined by said vessel walls into a relatively large compartment to be partly filled with said first fluid and a relatively small compartment to be charged with said second fluid when said vessel is in said angular starting position; and said relatively small compartment forming a bucket which when said vessel is in said angular starting position is on one side of the vertical plane through said axis and during turning of said vessel about said axis in one direction from said angular starting position with said relatively large compartment partly filled with said first fluid and said relatively small compartment charged with said second fluid, tilts to the other side of said vertical plane for pouring said second fluid into said first fluid, then is immersed in said now collected fluids to entrap air and then permits the air entrapped therein to escape therefrom by bubbling up through said collected fluids to mix them.

2. Apparatus as claimed in claim 1, in which said elongated partition when said vessel is in said angular starting position extends in a plane substantially parallel to and at a distance from the vertical plane through said axis.

3. Apparatus as claimed in claim 1, in which said vessel has the shape of a substantially circular, hollow disk with said side walls for sides and said circumferential wall for circumference and is mounted for turning in its own plane in substantially vertical position thereof.

4. Apparatus as claimed in claim 3, in which said substantially circular disk is mounted for turning about its own center.

5. Heat leakage microcalorimeter especially for biochemical systems comprising means forming a heat sink mounted for rotation about a substantially horizontal axis; two substantially flat side walls and a circumferential wall spacing and joining said side walls defining a vessel, said vessel being enclosed by said heat sink and arranged so as to partake in the rotation thereof about said axis with said side walls at substantially right angles to said axis; thermopile means encompassed between said side walls of said vessel and said heat sink; and an elongated partition joining said side walls and protruding from a portion of said circumferential wall and ending at a point inwards from said circumferential wall for dividing the space confined by said vessel walls into a relatively large compartment to be partly filled with a first liquid reactant and a relatively small compartment forming a bucket which when said vessel is in a certain angular starting position about said axis is on one side of and at a distance from the vertical plane through said axis and can be charged with a second liquid reactant, the arrangement being such that said bucket during turning of said vessel about said axis in one direction from said starting position with said relatively large compartment partly filled with said first reactant and said bucket charged with said second reactant, tilts to the other side of said vertical plane for pouring said second reactant into said first reactant, then is immersed in said now collected reactants to entrap air and then permits the air entrapped therein to escape therefrom by bubbling up through said collected reactants to mix them.

6. Heat leakage microcalorimeter as in claim 5, in which said heat sink comprises two primary heat sink blocks disposed on the opposite sides of said vessel in facing relationship to each one of said flat side walls, said thermopile means being enclosed between each one of said blocks and one of said side walls and a secondary heat sink body surrounding both said vessel, said thermopile means and said primary heat sink blocks.

7. Apparatus for mixing a first fluid with a second fluid with a minimum amount of thermal disturbance comprising two substantially flat side walls and a circumferential wall spacing and joining said side walls for defining a vessel, means mounting said vessel for turning from a certain angular starting position about a substantially horizontal axis with said side walls at substantially right angles to said axis, an elongated partition joining said side walls and protruding from a portion of said circumferential wall and ending at a point inwards from said circumferential wall for dividing the space confined by said vessel walls into a relatively large compartment to be partly filled with said first fluid and a relatively small compartment to be charged with said second fluid when said vessel is in said angular starting position, and said relatively small compartment forming a bucket which when said vessel is in said angular starting position takes an upright position therein and during turning of said vessel about said axis in one direction from said angular starting position with said relatively large compartment partly filled with said first fluid and said relatively small compartment charged with said second fluid, tilts for first pouring said second fluid into said first fluid and then for entrapping air and then for permitting the air entrapped therein to escape therefrom by bubbling up through said fluids in said relatively large compartment to mix them.

References Cited

UNITED STATES PATENTS 3,273,968    9/1966    Benzinger _____ 23—253

MORRIS O. WOLK, Primary Examiner

E. A. KATZ, Assistant Examiner

U.S. Cl. X.R.

73—190